Oct. 28, 1958 D. R. TASHJIAN ET AL 2,858,180

ROTARY SUPPORT FOR ELECTRONIC CHASSIS

Filed April 17, 1956 2 Sheets-Sheet 1

INVENTORS
David R. Tashjian
Orville C. Hall
Edward E. Miller,
BY George Sipkin
B. L. Zangwill
ATTORNEY

ROTARY SUPPORT FOR ELECTRONIC CHASSIS

Filed April 17, 1956 2 Sheets-Sheet 2

INVENTORS
David R. Tashjian
Orville C. Hall
Edward E. Miller,
BY George Lipkin
B. L. Zangwill
ATTORNEY United States Patent Office 2,858,180
Patented Oct. 28, 1958

2,858,180

ROTARY SUPPORT FOR ELECTRONIC CHASSIS

David R. Tashjian, Orville C. Hall, and Edward E. Miller, Baltimore, Md., assignors, by mesne assignments, to the United States of America as represented by the Secretary of the Navy Application April 17, 1956, Serial No. 578,855

1 Claim. (Cl. 312—302)

This invention relates to cabinets for electronic equipment and particularly to supporting means for the chassis that mounts such equipment.

One of the problems in the design of electronic equipment cabinets is accessibility of such equipment. It is desirable, in fact necessary that the chassis which mounts such equipment be readily removable from the cabinet which supports and houses such equipment.

Heretofore, in order to gain access to certain of the electronic equipment contained within a cabinet, whether during the original assembly, inspection or servicing thereof, it has been necessary that the chassis mounting the equipment be separated entirely from the cabinet. Merely moving the chassis part way out of the cabinet would not give access to certain equipment mounted thereon. This prior method of detaching the chassis from the cabinet particularly for inspection and service is unsatisfactory.

It is therefor an object of this invention to provide an improved manner of movably supporting an electronic chassis within a cabinet.

It is a further and more specific object of this invention to provide in a cabinet a chassis supporting means whereby all equipment mounted on the chassis may be rendered available without detaching the chassis from the cabinet.

The above and other objects and advantages of the invention will become more apparent from the following description and accompanying drawing, which illustrates a preferred embodiment, and wherein.

Figure 1:
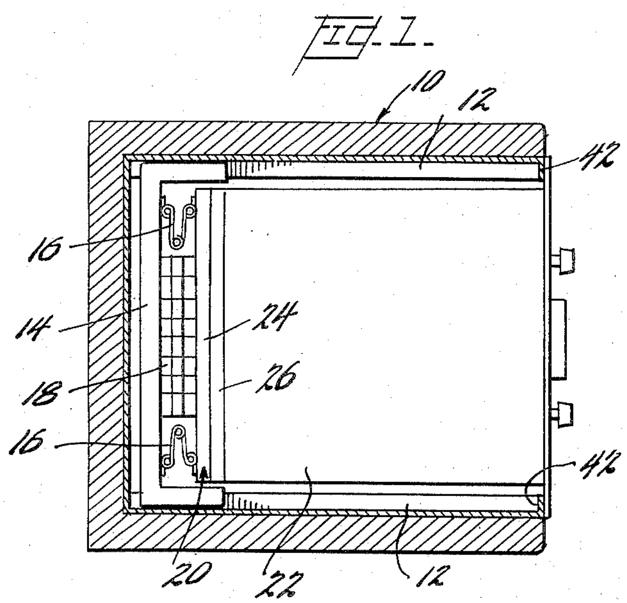
Fig. 1 is a top plan view, partly in horizontal section, showing an electronic equipment chassis within a cabinet in accordance with this invention.
Figure 2:
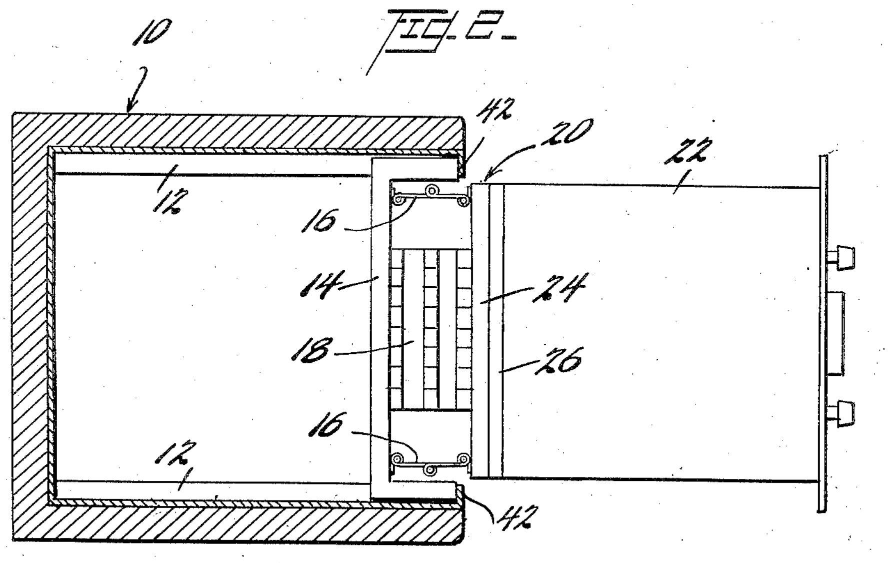
Fig. 2 is a top plan view similar to Fig. 1, showing the chassis withdrawn from the cabinet while still supported thereby.

Referring now to Figs. 1 and 2 of the drawings, 10 indicates a cabinet provided with a pair of slide rails 12 on the lower portion of opposite side walls thereof, and upon which slide rails is mounted a sliding carriage 14. As shown, the carriage is generally C-shaped in horizontal section and, for reasons pointed out hereinafter, it extends to the top of the cabinet. At the front, exterior sides of the carriage are vertically mounted, multiple hinges 16, and between the vertical hinges and mounted on the front of the carriage is another multiple hinge 18, mounted horizontally. A rotatable support 20 is mounted on the front ends of the multiple hinges 16 and 18, and an equipment carrying chassis 22 is mounted on the rotatable support.

Figure 4:
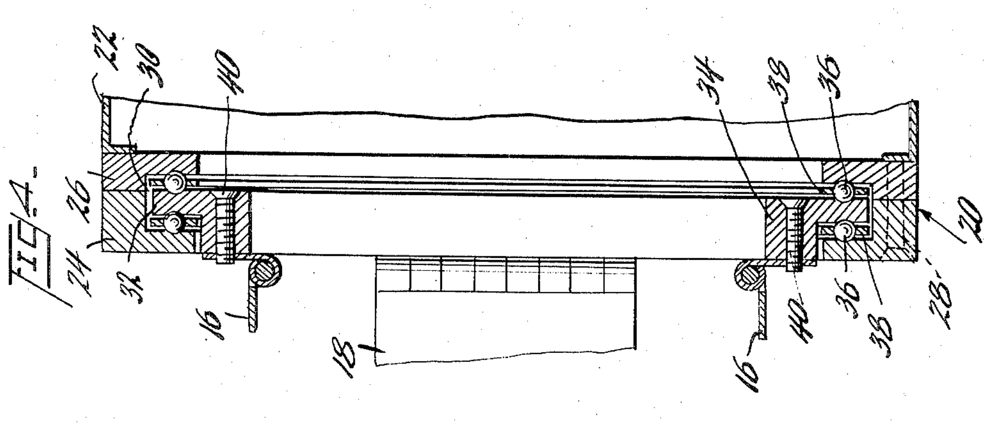
Fig. 4 is a horizontal section, taken on line 4—4 of Fig. 3.
Figure 3:
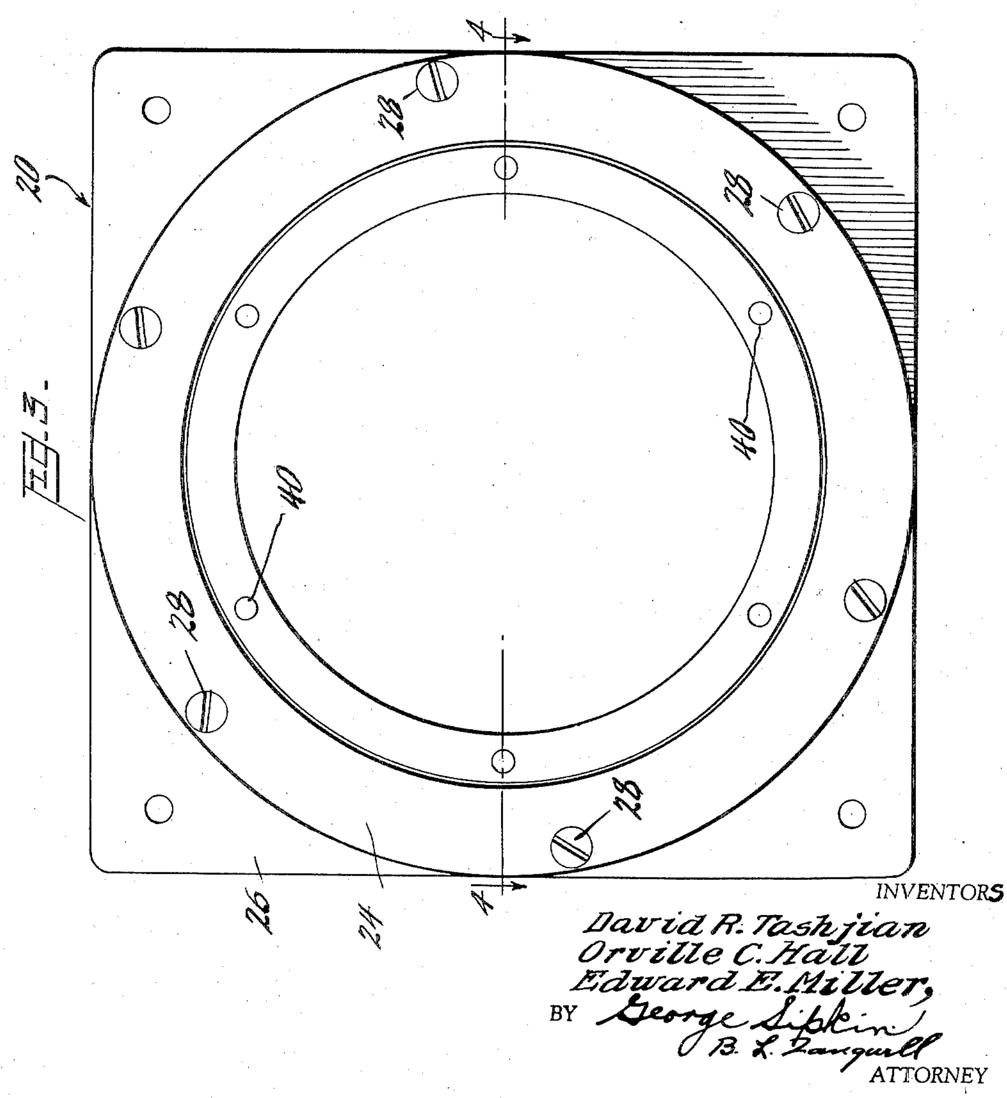
Fig. 3 is a rear elevational view of the chassis supporting means detached from the cabinet and with parts omitted.

Referring now to Fig. 4 of the drawings, the rotatable support 20 comprises two outer frame members 24 and 26 clamped together by a plurality of screws 28, only one of which screws is shown. The frame members 24 and 26 when clamped together provide an annular recess 30 for the reception of an annular portion 32 formed on a third frame member 34.

As shown in Fig. 4, the frame members 24, 26 and 32 are formed with mating circular recesses for the reception of two sets of ball bearings 36, which ball bearings are spaced around a circumference of the frame members and are held in spaced relation by a plurality of spacers 38. If desired, depending upon the size and weight of the chassis to be supported, the ball bearings may be replaced by easy-sliding surfaces on the frame members 24, 26 and 32. As pointed out hereinafter, the arrangement of the frame members is such that, with the third frame member 34 held stationary, the clamped members 24 and 26 may be freely rotated as a unit in either direction about a horizontal axis perpendicular to the front of the cabinet.

Referring still to Fig. 4, the front ends of the vertical hinges 16 and of the horizontal hinge 18 are attached, as by screws 40, to the rear face of the frame member 34, and the equipment mounting chassis 22, only partly shown in Fig. 4 is mounted by suitable means not shown on the front face of the frame member 26.

In operation, with the chassis 22 located within the cabinet 10 in normal operation position, the carriage 14 is at the rearmost portion of the cabinet and the hinges 16 and 18 are collapsed in the manner shown in Fig. 1. Thus, the mounting mechanism occupies a minimum of usable space within the cabinet. Now then, to assemble, inspect and/or service the electronic equipment (not shown) mounted on the chassis, the chassis is moved forward of the cabinet from the position shown in Fig. 1 to that shown in Fig. 2, during which movement the chassis is supported by the carriage 14, which carriage slides upon the rails 12 and the forward movement of which is limited by a pair of stops 42 mounted on the front of the cabinet. The stops may be removable for complete removal of the carriage and attached chassis from the cabinet.

After the front vertical edges of the carriage contact the stop members 42, continued forward movement of the chassis relative to the cabinet, and now relative to the carriage, causes both the vertical and horizontal hinges to open as shown in Fig. 2, whereupon the weight of the chassis is supported by the vertical hinges, and the horizontal hinge prevents side sway. Thus, the hinges provide an expansible linkage mechanism that permits movement of the chassis relative to the carriage. As stated heretofore, the carriage extends vertically from the slide rails to the top under surface of the cabinet (not shown). Because of this arrangement and the appreciable length of the forwardly projecting side portions of the carriage and their fit with the inner side walls of the cabinet, the carriage, through the vertical and horizontal hinges, supports the over-hanging chassis (Fig. 2) from all sides.

With the carriage at the forward limit of its travel (Fig. 2), the extension of the hinges permits the rear of the chassis to project beyond the cabinet and beyond protrusions on the front panels of any adjacent chassis and, through the rotatable mounting, the chassis may now be freely rotated in either direction about a horizontal axis perpendicular to the front in a manner as to expose the top, bottom and both sides of the chassis in convenient positions for inspection and servicing of equipment mounted thereon. If desired, suitable means, not shown, may be provided for holding the chassis in any position of rotation.

It will thus be seen, in accordance with this invention there is provided a relatively simple and inexpensive mechanism for supporting an electronic chassis beyond the confines of its cabinet or housing in a manner as to render accessible for inspection and servicing all equipment mounted on such chassis, which mechanism occupies a minimum of usable cabinet space when the chassis is in its normal operative position within the cabinet.

It should be understood, of course, that the foregoing disclosure relates to only a preferred embodiment of the invention and that numerous modifications or alterations may be made therein without departing from the spirit and the scope of the invention as set forth in the following claim.

What is claimed is:

In combination, a cabinet for electronic equipment and the like, a chassis for mounting such equipment, and means movably supporting said chassis on said cabinet for straight line and rotary movement relative thereto, said supporting means including a carriage slidably mounted on said cabinet for horizontal movement relative thereto, expansible-contractible linkage mechanism connected at one side thereof to said carriage and having a chassis supporting frame connected to an opposite side thereof, said chassis supporting frame including a first member fixedly attached to said opposite side of the linkage mechanism and a second member rotatably mounted at one side thereof on said first member and fixedly mounted on an opposite side thereof on said chassis, said second member being rotatably mounted on a horizontal axis perpendicular to the front of the cabinet for rotary movement of the chassis in a plane parallel to the front of the cabinet, and said linkage mechanism includes a plurality of multiple contractible-expansible hinges with certain of said hinges mounted vertically in horizontal-spaced relation for movably supporting said frame on and relative to said carriage in cantilever fashion and another of said hinges mounted horizontally in a manner as to hold said frame and through it said chassis against side sway relative to said carriage and cabinet.

References Cited in the file of this patent

UNITED STATES PATENTS

| | | |
|---|---|---|
| 730,209 | Hendrick | June 2, 1903 |
| 842,991 | Andress | Feb. 5, 1907 |
| 2,284,531 | Miller | May 26, 1942 |
| 2,650,871 | Holderegger | Sept. 1, 1953 |
| 2,655,422 | Gussack | Oct. 13, 1953 |